(12) United States Patent
Pattok et al.

(10) Patent No.: US 7,484,759 B2
(45) Date of Patent: Feb. 3, 2009

(54) VEHICLE POWER STEERING ASSEMBLY AND METHOD FOR ASSEMBLING THE VEHICLE POWER STEERING ASSEMBLY

(75) Inventors: Eric D. Pattok, Saginaw, MI (US); Rolf E. Kleinau, Bay City, MI (US); Donald J. Smith, Saginaw, MI (US); Ronald J. Hansen, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 583 days.

(21) Appl. No.: 11/188,425

(22) Filed: Jul. 25, 2005

(65) Prior Publication Data

US 2007/0017313 A1    Jan. 25, 2007

(51) Int. Cl.
*B62D 1/00* (2006.01)

(52) U.S. Cl. ........................ 280/771; 180/428
(58) Field of Classification Search ................. 280/771; 180/428, 441
See application file for complete search history.

(56) References Cited

U.S. PATENT DOCUMENTS

| | | | |
|---|---|---|---|
| 3,131,554 A * | 5/1964 | Hornschuch et al. | 173/93 |
| 4,387,737 A | 6/1983 | Tobiasz | 137/625.21 |
| 5,092,418 A * | 3/1992 | Suzuki et al. | 180/441 |
| 5,478,059 A | 12/1995 | Toyoshi et al. | 267/273 |
| 5,727,443 A | 3/1998 | Baxter et al. | 91/375 A |
| 6,782,966 B2 | 8/2004 | Sahr | 180/428 |

* cited by examiner

*Primary Examiner*—Eric Culbreth
(74) *Attorney, Agent, or Firm*—Thomas N. Twomey (57) ABSTRACT

A vehicle power steering assembly is provided. The vehicle power steering assembly includes an input shaft having first and second end portions that extend along an axis, and a first aperture that extends substantially axially into the first end portion. The vehicle power steering assembly further includes a torsion shaft having third and fourth end portions. The third end portion has a first plurality of splines and the fourth end portion has a second plurality of splines. The third end portion is disposed in the first aperture of the input shaft. The first plurality of splines on the third end portion fixedly couples the torsion shaft to the input shaft. The vehicle power steering assembly further includes an output shaft having fifth and sixth end portions, and a second aperture that extends substantially axially into the fifth end portion toward the sixth end portion. The fourth end portion of the torsion shaft is disposed in the second aperture of the output shaft. The second plurality of splines on the fourth end portion fixedly couples the torsion shaft to the output shaft. A rotational movement of the input shaft a predetermined distance in a first direction about the axis induces rotational movement of the output shaft in the first direction.

9 Claims, 11 Drawing Sheets

VEHICLE POWER STEERING ASSEMBLY AND METHOD FOR ASSEMBLING THE VEHICLE POWER STEERING ASSEMBLY

TECHNICAL FIELD

This application relates to a vehicle power steering assembly and a method for assembling the vehicle power steering assembly.

BACKGROUND

Vehicle steering systems have utilized torsion bars for actuating a gear or valve assembly for assisting a driver in steering a vehicle. The torsion bar is connected to an input shaft via a pin that extends through an aperture in both the torsion bar and input shaft.

A problem associated with this configuration, is that both the torsion bar and the input shaft are constructed from a steel having a relatively low hardness, to allow drilling and reaming tools to drill the aperture through the torsion bar and the input shaft. As a result, an operational life-time of the torsion bar and the input shaft can be reduced.

Accordingly, there is a need for an improved vehicle steering system that eliminates and/or reduces the foregoing problem.

SUMMARY OF THE INVENTION

A vehicle power steering assembly in accordance with an exemplary embodiment is provided. The vehicle power steering assembly includes an input shaft having first and second end portions that extend along an axis, and a first aperture that extends substantially axially into the first end portion. The vehicle power steering assembly further includes a torsion shaft having third and fourth end portions. The third end portion has a first plurality of splines and the fourth end portion has a second plurality of splines. The third end portion is disposed in the first aperture of the input shaft. The first plurality of splines on the third end portion fixedly couples the torsion shaft to the input shaft. The vehicle power steering assembly further includes an output shaft having fifth and sixth end portions, and a second aperture that extends substantially axially into the fifth end portion toward the sixth end portion. The fourth end portion of the torsion shaft is disposed in the second aperture of the output shaft. The second plurality of splines on the fourth end portion fixedly couples the torsion shaft to the output shaft. A rotational movement of the input shaft a predetermined distance in a first direction about the axis induces rotational movement of the output shaft in the first direction.

A method of assembling a vehicle power steering assembly in accordance with another exemplary embodiment is provided. The vehicle power steering assembly includes an input shaft, a torsion shaft, and an output shaft. The input shaft includes first and second end portions that extend along an axis, and a first aperture that extends substantially axially into the first end portion. The torsion shaft has third and fourth end portions. The third end portion has a first plurality of splines and the fourth end portion has a second plurality of splines. The output shaft has fifth and sixth end portions, and a second aperture that extends substantially axially into the fifth end portion toward the sixth end portion. The method includes disposing the third end portion of the torsion shaft into the first aperture of the input shaft. The method further includes applying a first axial force to either the input shaft or the torsion shaft to urge the first plurality of splines of the torsion shaft against an inner surface of the input shaft defined by the first aperture such that the third end portion of the torsion shaft is fixedly coupled to the input shaft. The method further includes disposing the fourth end portion of the torsion shaft into the second aperture of the output shaft. The method further includes applying a second axial force to an outer surface of the sixth end portion of the output shaft to urge the second plurality of splines on the torsion shaft against an inner surface of the output shaft defined by the second aperture such that the fourth end portion of the torsion shaft is fixedly coupled to the output shaft.

A vehicle steering system in accordance with another exemplary embodiment is provided. The vehicle steering system includes a steering wheel. The vehicle steering system further includes an input shaft having first and second end portions that extend along an axis, and a first aperture that extends substantially axially into the first end portion. The second end portion is operably coupled to the steering wheel. The vehicle steering system further includes a torsion shaft having third and fourth end portions. The third end portion has a first plurality of splines and the fourth end portion has a second plurality of splines. The third end portion is disposed in the first aperture of the input shaft. The first plurality of splines on the third end portion fixedly couples the torsion shaft to the input shaft. The vehicle steering system further includes an output shaft having fifth and sixth end portions, and a second aperture that extends substantially axially into the fifth end portion toward the sixth end portion. The fourth end portion of the torsion shaft is disposed in the second aperture of the output shaft. The second plurality of splines on the fourth end portion of the torsion shaft fixedly couples the torsion shaft to the output shaft. The vehicle steering system further includes a gear assembly that is operably coupled to the output shaft such that rotation of the torsion shaft in a first direction induces operation of the gear assembly.

DETAILED DESCRIPTION OF EXEMPLARY EMBODIMENTS

Figure 1:
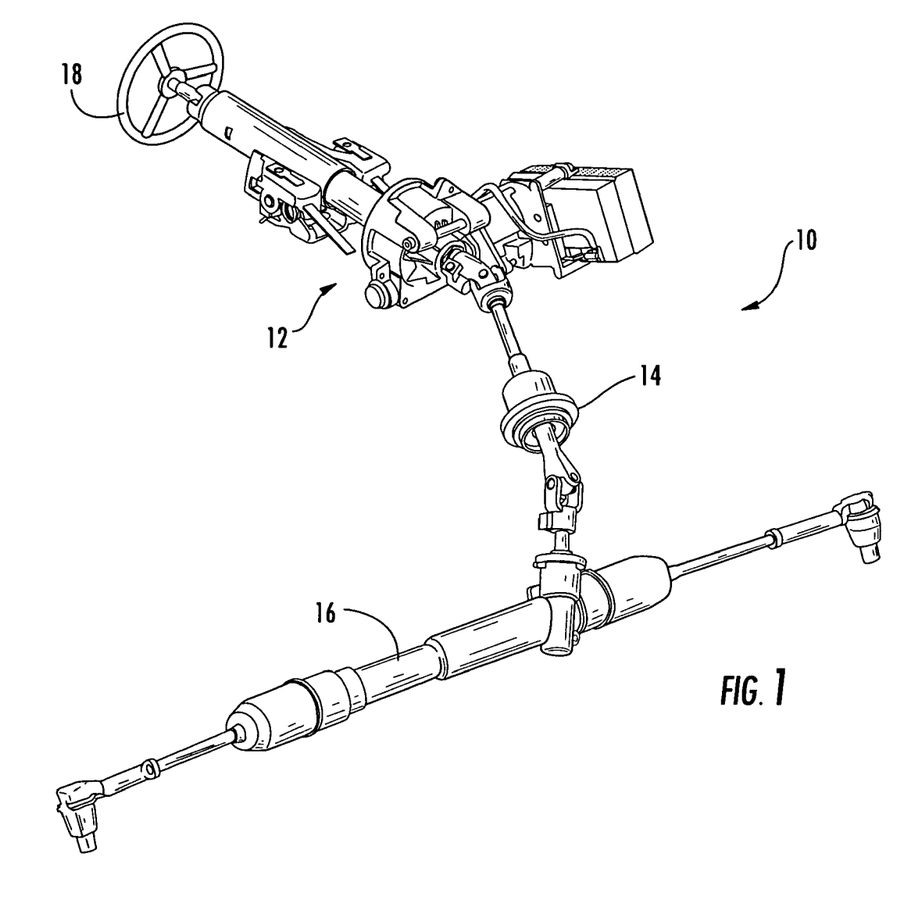
FIG. 1 is a perspective view of a vehicle steering system having a power steering assembly, an intermediate connecting assembly, a rack and pinion assembly, and a steering wheel in accordance with an exemplary embodiment of the present invention.

Referring to FIG. 1, a vehicle steering system 10 in accordance with an exemplary embodiment is illustrated. The vehicle steering system 10 includes a power steering assembly 12, an intermediate connecting assembly 14, a rack and pinion assembly 16, and a steering wheel 18. In the exemplary embodiment, the power steering assembly 12 is utilized in an electric column power steering system. In alternate embodiments, the power steering assembly 12 can be utilized in at least one of: (i) a hydraulic integral-gear power steering system, (ii) a hydraulic rack and pinion gear power steering system, (iii) an electric integral gear power steering system, (iv) an electric rack and pinion gear power steering system, (v) a steer-by-wire column power steering system.

Figure 2:
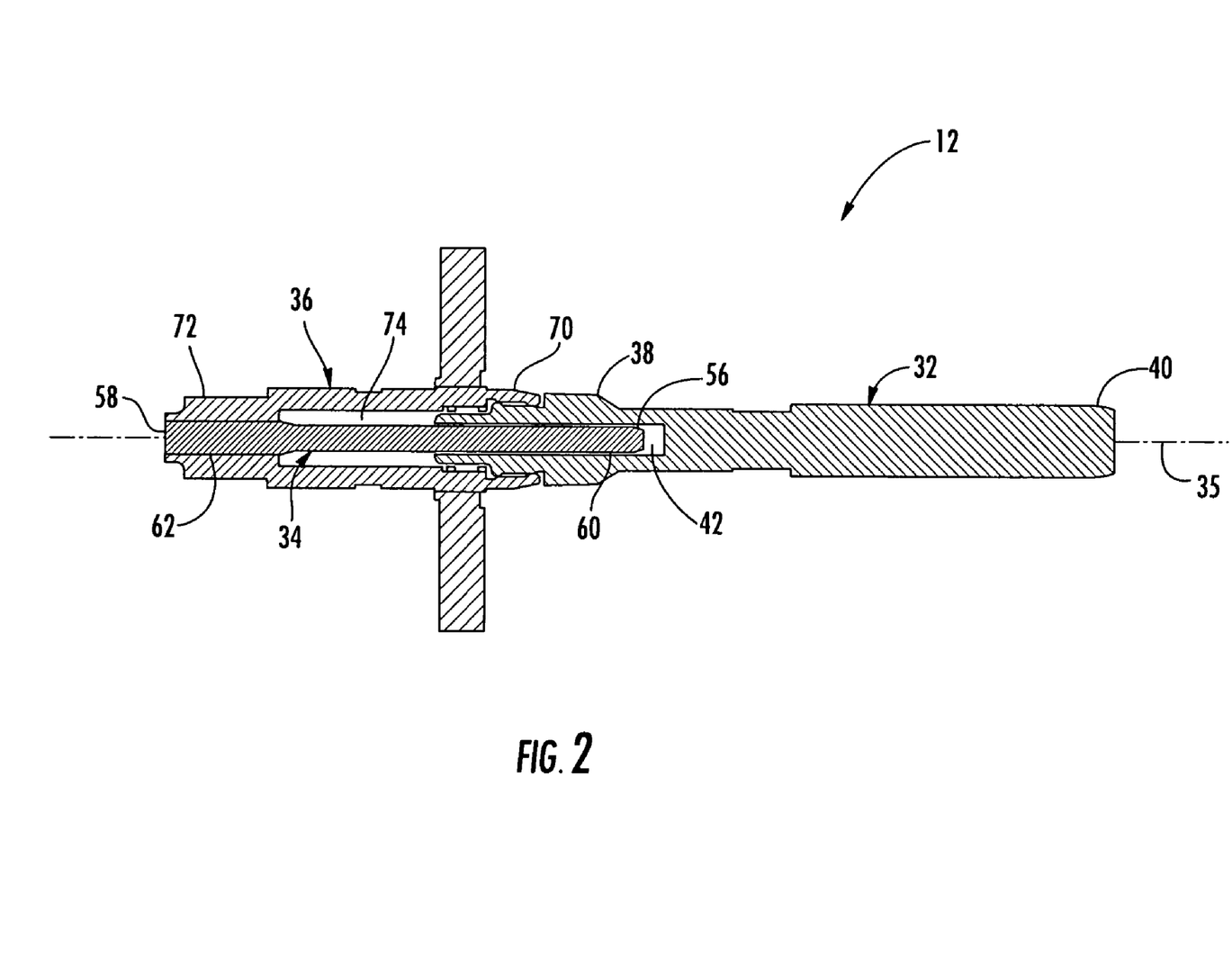
FIG. 2 is a cross sectional view of the power steering assembly having an input shaft, a torsion shaft, and an output shaft utilized in the vehicle steering system of FIG. 1.
Figure 7:
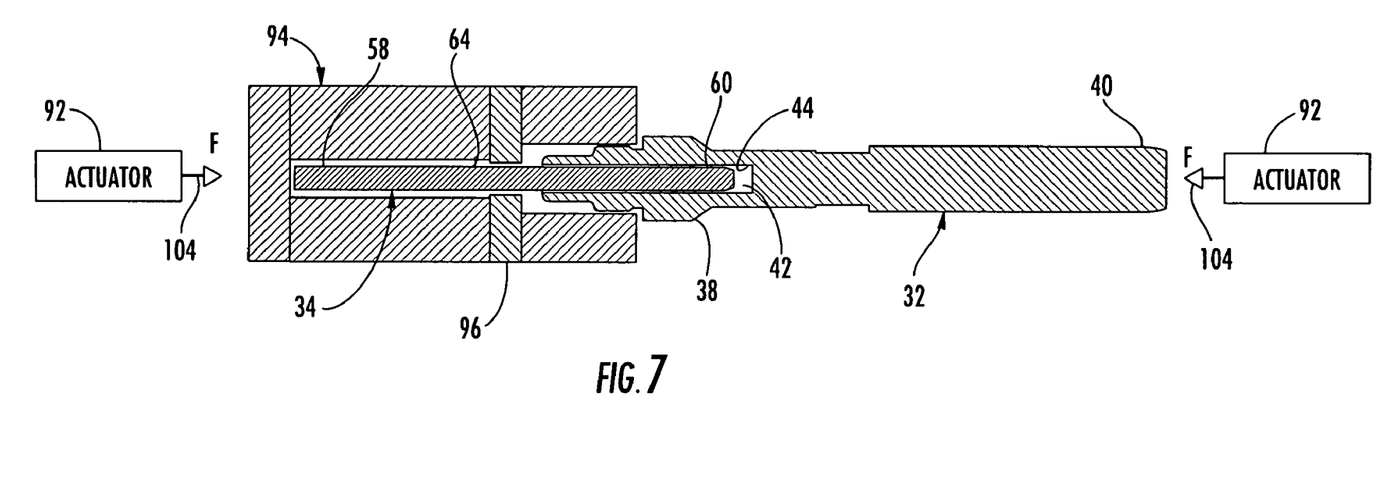
FIG. 7 is a cross sectional view of the input shaft, the torsion shaft, a compression fixture, and actuators for coupling the torsion shaft to the input shaft.

Referring to FIGS. 2 and 7, power steering assembly 12 includes an input shaft 32, a torsion shaft 34, and an output shaft 36. The torsion shaft 34 is rigidly coupled to both the input shaft 32 and the output shaft 36. The input shaft 32, the torsion shaft 34, and the output shaft 36 have substantially circular cross sections and are constructed from a rigid material, such as steel for example. The input shaft 32 includes end portions 38 and 40, and an aperture 42 extending along an axis 35 substantially into the end portion 38 toward the end portion 40. An inner surface 44 defined by the aperture 42 is configured for receiving a portion of the torsion shaft 34. The input shaft 32 is configured to be operably coupled to the steering wheel 18 proximate the end portion 40.

Figure 9:
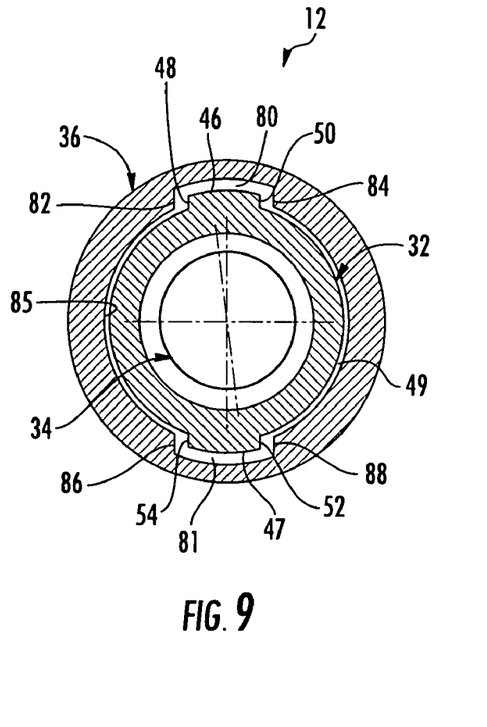
FIG. 9 is cross sectional view of FIG. 8 illustrating the output shaft in a first rotational position.
Figure 10:
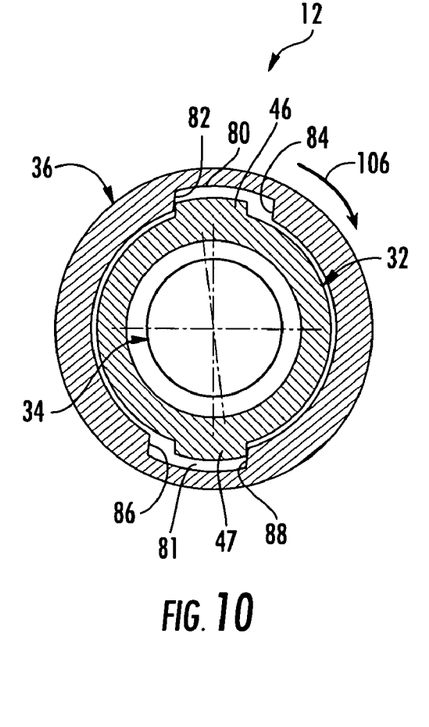
FIG. 10 is a cross sectional view of FIG. 8 illustrating the output shaft in a second rotational position.
Figure 11:
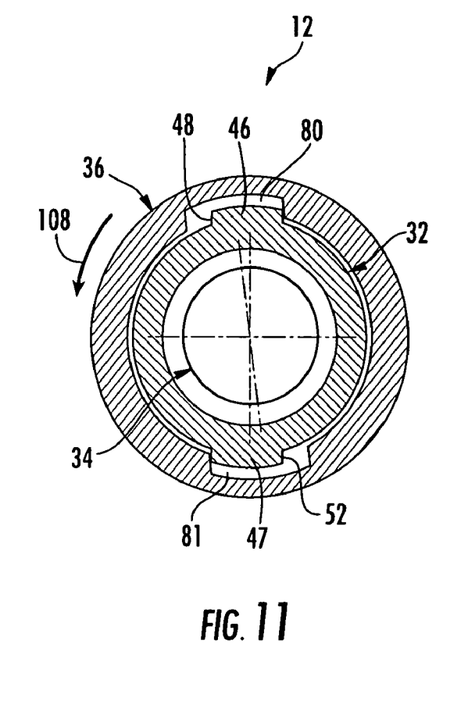
FIG. 11 is a cross sectional view of FIG. 8 illustrating the output shaft in a third rotational position.
Figure 12:
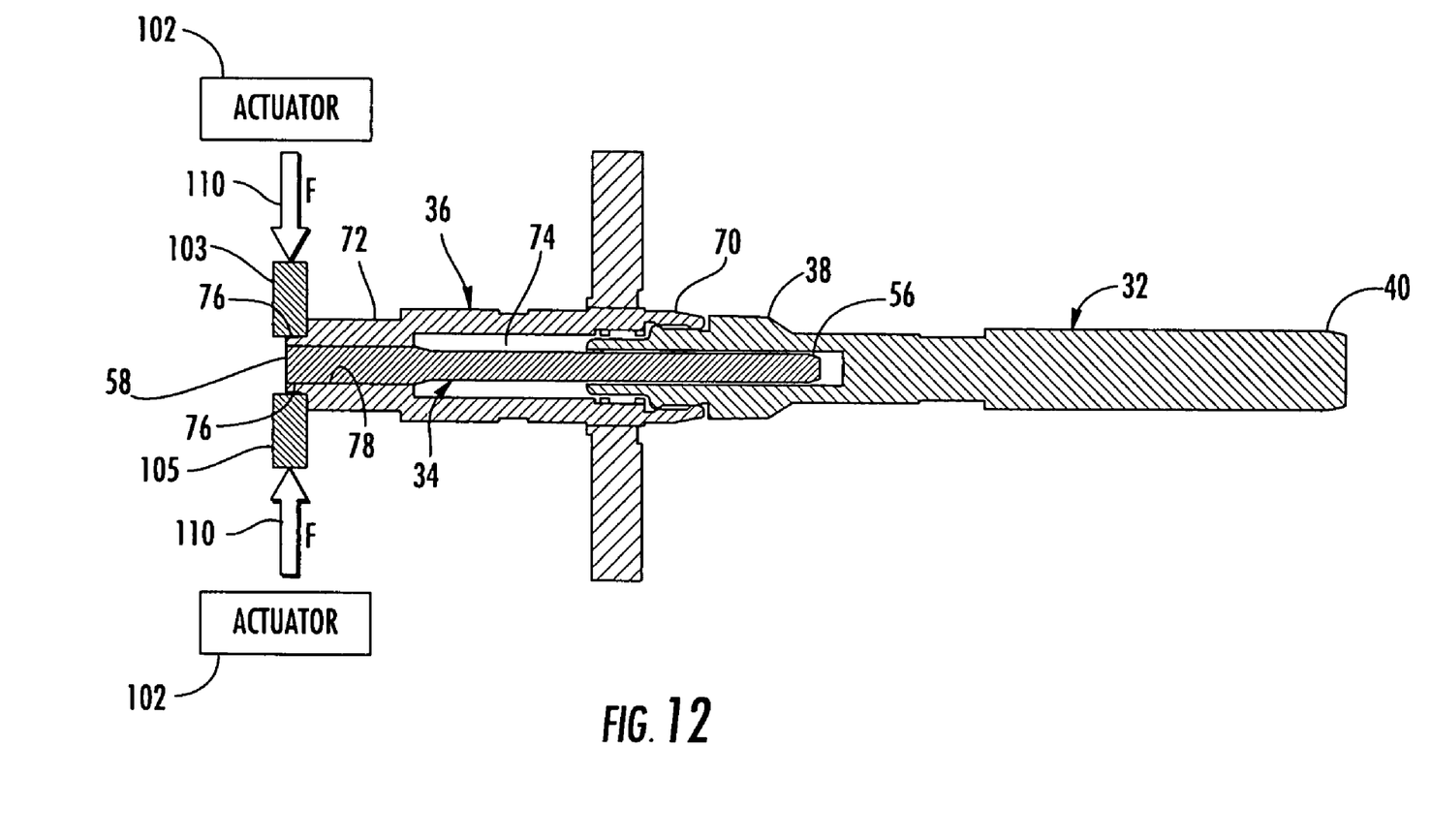
FIG. 12 is a cross sectional view of the input shaft, the torsion shaft, the output shaft, and an actuator for affixing the output shaft to the torsion shaft.

Referring to FIGS. 2 and 9, the end portion 38 of the input shaft 32 includes stopping flanges 46, 47 spaced apart from each other and extending outwardly from an outer surface 49 of the input shaft 32. The stopping flanges 46, 47 are provided for limiting the amount of rotational displacement of the torsion shaft 34 relative to the input and output shafts 32, 36. The stopping flange 46 defines side surfaces 48, 50. The stopping flange 47 defines side surfaces 52, 54. Of course, the configuration and number of flanges disposed around the periphery of the inner shaft 32 can vary.

Figure 3:
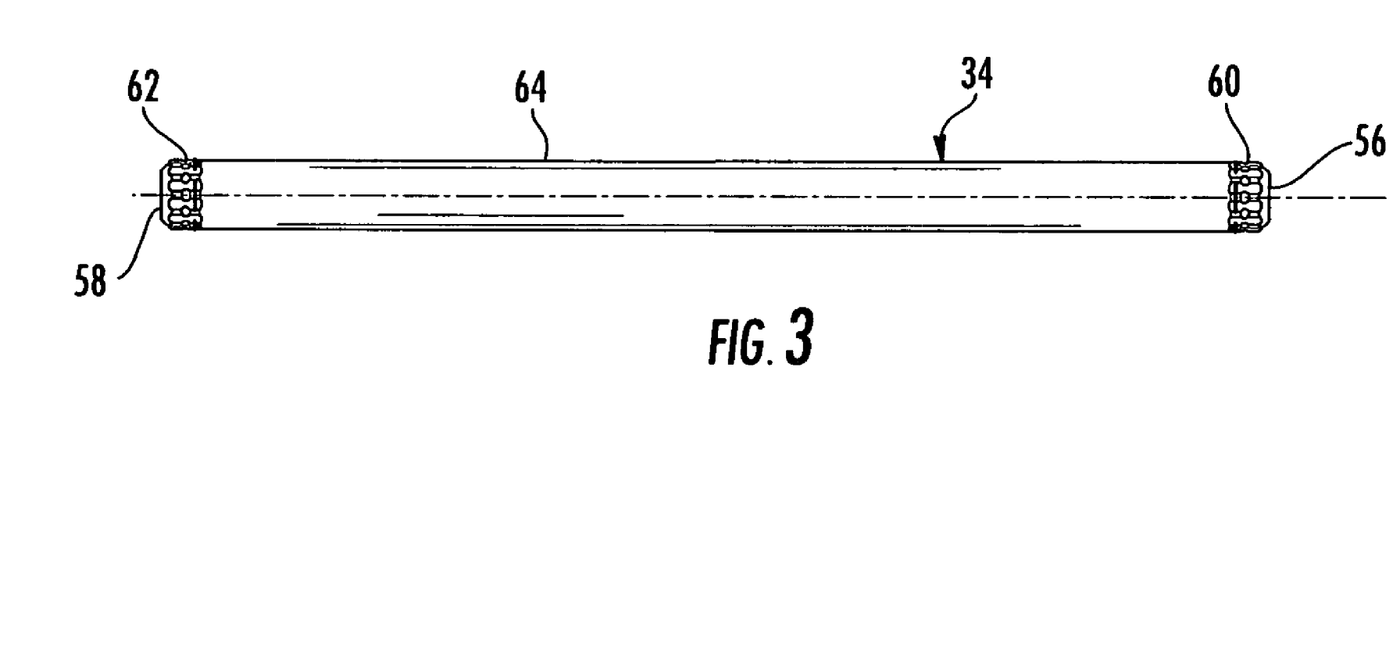
FIG. 3 is a side view of the torsion shaft of FIG. 2.
Figure 4:
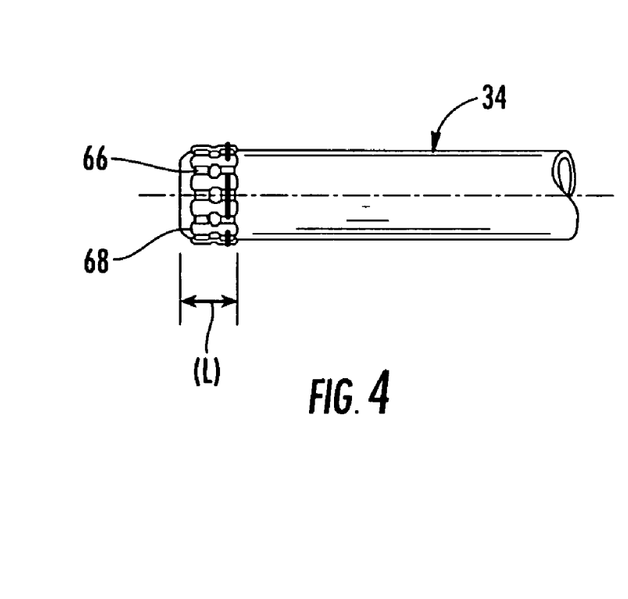
FIG. 4 is an enlarged view of a splined end of the torsion shaft of FIG. 3.
Figure 5:
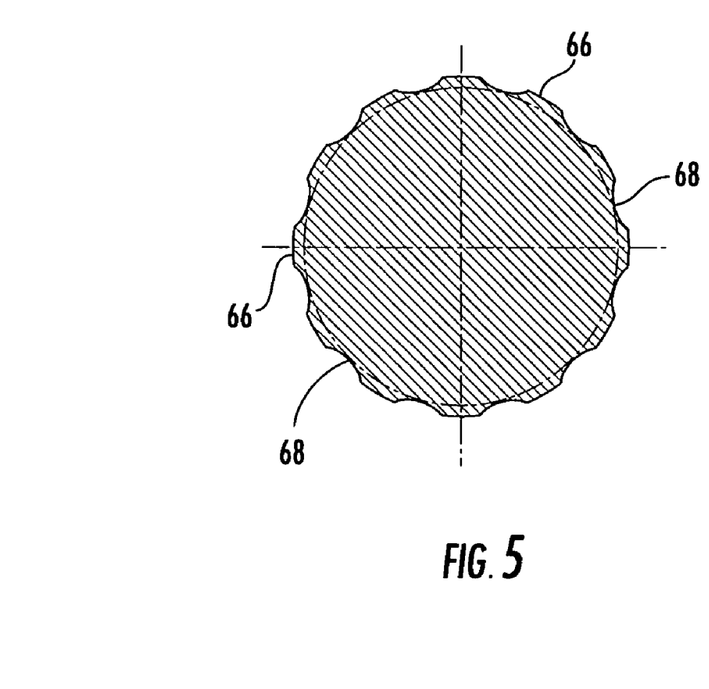
FIG. 5 is an enlarged end view of the torsion shaft of FIG. 4.

Referring to FIGS. 3-5, the torsion shaft 34 is provided for indicating an amount of torque applied the input shaft 32. The torsion shaft 34 comprises an intermediate portion 64 and end portions 56, 58. The end portion 56 includes splines 60 disposed circumferentially about the end portion 56. The end portion 58 includes splines 62 disposed circumferentially about the end portion 58. The splines 60 fixedly engage the inner surface 44 of the input shaft 32, therein fixedly coupling the torsion shaft 34 to the input shaft 32. The splines 60, 62 each comprise a plurality of raised teeth 66 and valleys 68 disposed between teeth 66, illustrated in FIGS. 4 and 5. The splines 60, 62 have a defined length "L." In this embodiment, the splines 60, 62 have substantially similar configurations. In an alternative embodiment, the configuration of splines 60, 62 may be different from one another. Referring to FIGS. 1, 2, and 9 the output shaft 36 is provided to transmit torque from the input shaft 32 to the intermediate connecting assembly 14. The output shaft 36 includes end portions 70, 72, and an aperture 74 extending substantially axially into the end portion 70 toward the end portion 72. The aperture 74 defines an inner surface 85. Further, the aperture 74 is configured to receive at least a portion of the torsion shaft 34.

Referring to FIGS. 2 and 9-11, the output shaft 36 further includes slots 80, 81 spaced apart from one another and disposed proximate the end portion 70. The slot 80 is configured to receive the stopping flange 46 of the input shaft 32 therein. The slot 81 is configured to receive the stopping flange 47 of the input shaft 32 therein. The slot 80 extends from the surface 85 defined by the aperture 74 into the output shaft 36. Further, the slot 81 extends from the surface 85 defined by the aperture 74 into the output shaft 36. The slot 80 defines surfaces 82, 84 of the output shaft 36 configured to contact surfaces 48, 50, respectively of the input shaft 32 when the input shaft 32 rotates a predetermined distance counterclockwise or clockwise, respectively, relative to the output shaft 36. Similarly, the slot 81 defines surfaces 86, 88 of the output shaft 36 configured to contact surfaces 54, 52, respectively, of the input shaft 32 when the input shaft 32 rotates a predetermined distance counterclockwise or clockwise, respectively, relative to the output shaft 36. In an alternative embodiment, the output shaft 36 may have a single slot configured to receive a single stopping flange, or a plurality of slots disposed around the periphery of aperture 74 where at least a portion of the slots are configured to receive stopping flanges. Further, the output shaft 36 is configured to be operably coupled to a gear assembly.

Figure 8:
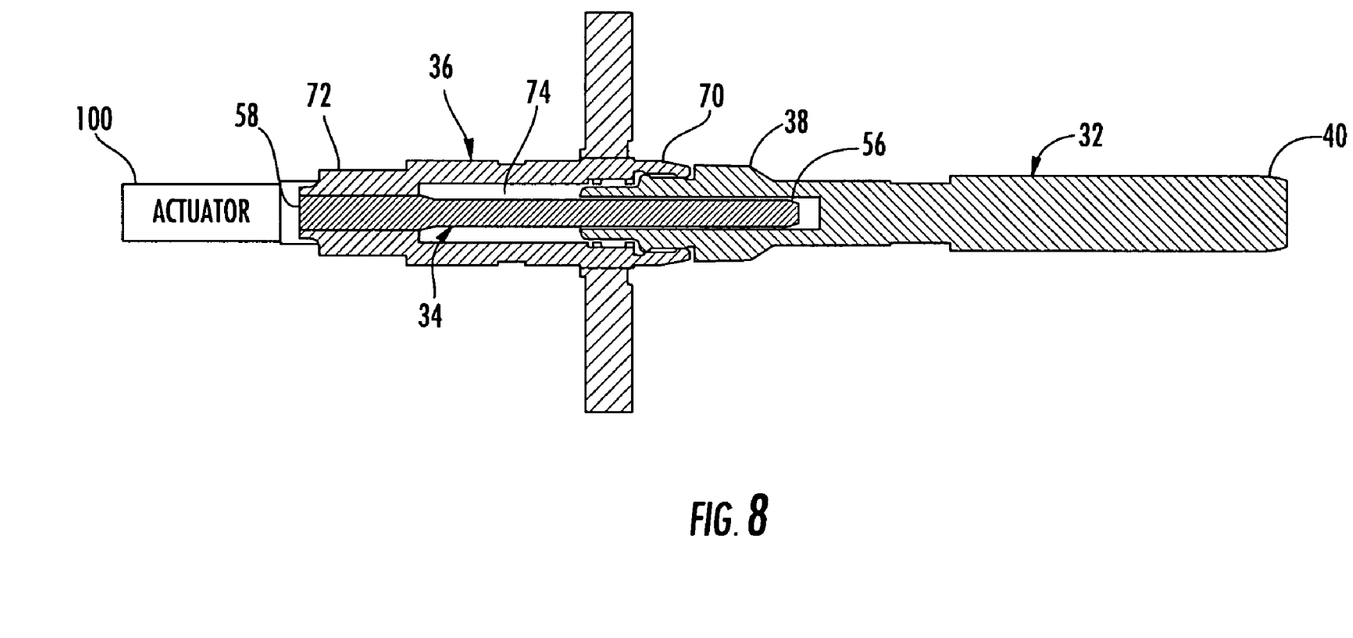
FIG. 8 is a cross sectional view of the input shaft, the torsion shaft, the output shaft, and an actuator for positioning the output shaft relative to the input shaft and the torsion shaft.

Referring to FIG. 8, in one embodiment, a torque sensor (not shown) can be operably coupled to the surfaces 38, 70. The torque sensor can generate an output signal indicative of an angular displacement of the output shaft 36 relative to the input shaft 32. The output signal is utilized by the power steering system to assist an operator in turning vehicle wheels to a desired position. In another embodiment, a hydraulic valve (not shown) can be operably coupled to surfaces 38, 70 to generate a hydraulic fluid signal indicative of an angular displacement of the output shaft 36 relative to the input shaft 32. The hydraulic fluid signal is utilized by the power steering system to assist the operator in turning vehicle wheels to the desired position.

Figure 15:
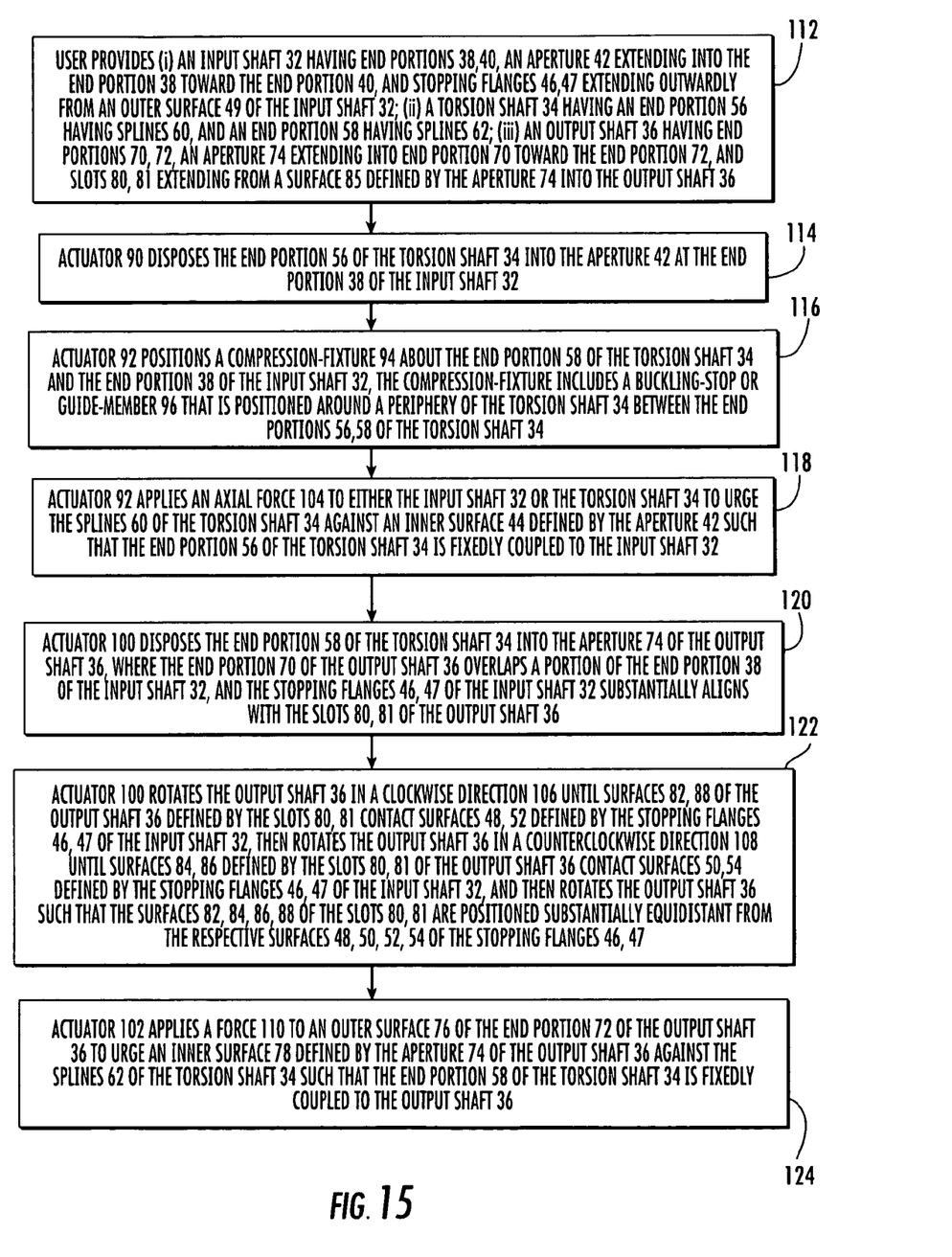
FIG. 15 is a flow chart of a method of assembling a power steering assembly in accordance with an exemplary embodiment.

Referring to FIG. 15, a method of assembling the vehicle power steering assembly 12 in accordance with an exemplary embodiment is illustrated. At step 112, a user provides (i) an input shaft 32 having end portions 38, 40, an aperture 42 extending into the end portion 38 toward the end portion 40, and stopping flanges 46, 47 extending outwardly from an outer surface 49 of the input shaft 32; (ii) a torsion shaft 34 having an end portion 56 having splines 60, and an end portion 58 having splines 62; (iii) an output shaft 36 having end portions 70, 72, an aperture 74 extending into the end portion 70 toward the end portion 72, and slots 80, 81 extending from a surface 85 defined by the aperture 74 into the output shaft 36.

Figure 6:
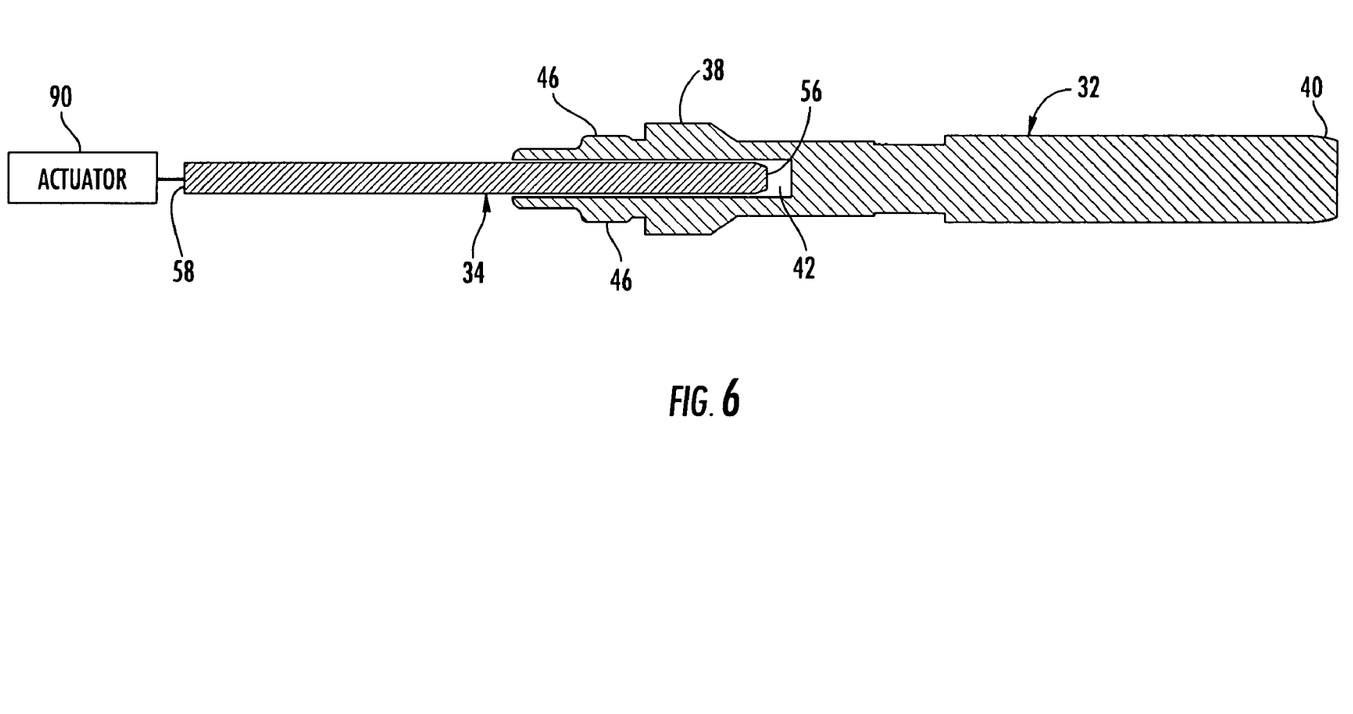
FIG. 6 is a cross sectional view of the input shaft, the torsion shaft, and an actuator for positioning the torsion shaft in the input shaft.

Referring to FIGS. 6 and 15, next at step 114, an actuator 90 disposes the end portion 56 of the torsion shaft 34 into the aperture 42 of the input shaft 32. Of course, in an alternative embodiment, the end portion 56 can be manually disposed into the aperture 42.

Referring to FIGS. 7 and 15, next at step 116, an actuator 92 positions a compression fixture 94 about the end portion 58 of the torsion shaft 34 and the end portion 38 of input shaft 32. The compression fixture 94 includes a buckling-stop or guide-member 96 positioned proximate the periphery of the torsion shaft 34 between the end portions 56, 58. The compression fixture 94 is configured to support and guide the torsion shaft 34 into the aperture 42 of the torsion shaft 34 when the torsion shaft 34 is being coupled to the input shaft 32. The buckling-stop 96 is configured to prevent the torsion shaft 34 from plastically deforming when the torsion shaft 34 is being coupled to the input shaft 32.

Next, at step 118, the actuator 92 applies an axial force 104 to either the compression fixture 94 or the input shaft 32 urging the splines 60 into an inner surface 44 of the aperture 42 such that the end portion 56 of the torsion shaft 34 is fixedly coupled to the input shaft 32.

Referring to FIGS. 8 and 15, next at step 120, an actuator 100 disposes the end portion 58 of the torsion shaft 34 into the aperture 74 of the output shaft 36, where the end portion 70 of the output shaft 36 overlaps a portion of the end portion 38 of the input shaft 32, and the stopping flanges 46, 47 of the input shaft 32 substantially align with the slots 80, 81 of the output shaft 36.

Referring to FIGS. 9-11 and 15, next at step 122, while the input shaft 32 and the torsion shaft 34 are fixed from rotating, the actuator 100 rotates the output shaft 36 in a clockwise direction 106 until a surface 82 defined by the slot 80 of the output shaft 36 contacts a surface 48 defined by the stopping flange 46 of the input shaft 32. Further, a surface 88 defined by the opposite slot 81 contacts a surface 52 defined by the opposite stopping flange 47 substantially at the same time as the surface 82 of the slot 80 contacts the surface 48 of the stopping flange 46. The actuator 100 then rotates the output shaft 36 in a counterclockwise direction 108 until surfaces 84, 86 defined by the slots 80, 81 of the output shaft 36 contact respective surfaces 50, 54 defined by the stopping flanges 46, 47 of the input shaft 32. The actuator 100 then rotates the output shaft 36 to a position such that the surfaces 82, 84, and surfaces 86, 88 defined by the slots 80, 81, respectively, of the output shaft 36 are positioned substantially equidistant from the surfaces 48, 50, and surfaces 52, 54, respectively, defined by the stopping flanges 46, 47 of the input shaft 32. The actuator 100 is configured to measure, an amount of rotation between slot and flange contacting surfaces in order to position the output shaft 36 as described above.

The sequence of rotational movements described in step 122 can be varied so long as the final position of the slots 80, 81 and the flanges 46, 47 allows for a substantially equal amount of rotation in a clockwise or counterclockwise direction 106, 108 before contact occurs between a slot and the respective flange surface. In the present embodiment, the maximum amount of rotation in either direction is approximately 10 degrees. In an alternative embodiment, the amount of rotation can be greater than 10 degrees.

Referring to FIGS. 12-15, next at step 124, an actuator 102 applies a force 110 to an outer surface 76 at the end portion 72 of the output shaft 36 to urge an inner surface 78 defined by the aperture 74 of the output shaft 36 against the splines 62 of the torsion shaft 34 such that the end portion 58 of the torsion shaft 34 is fixedly coupled to the output shaft 36.

Figure 13:
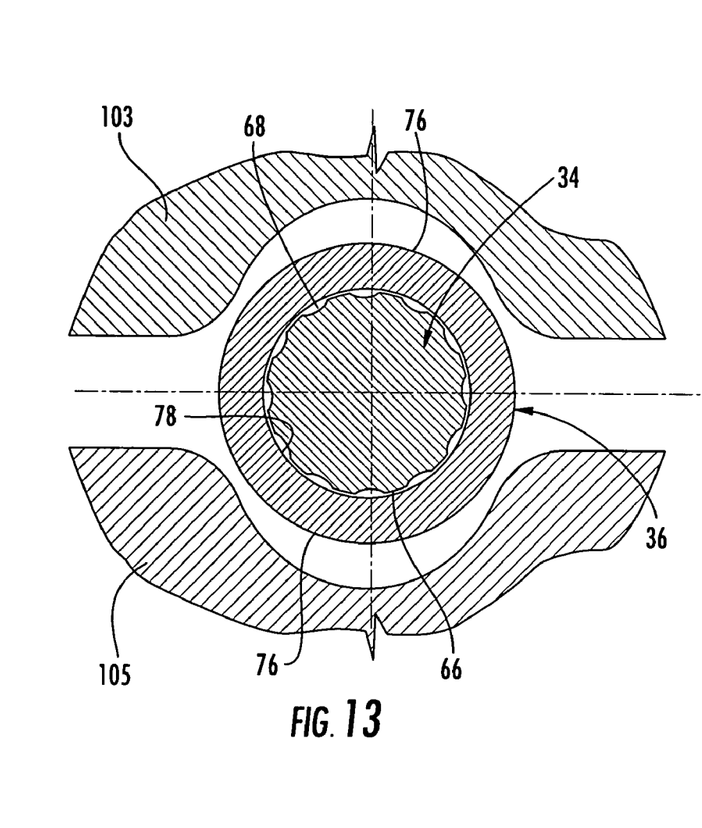
FIG. 13 is an enlarged cross sectional view of FIG. 12 illustrating the input shaft, the torsion shaft, the output shaft, and portions of the actuator.
Figure 14:
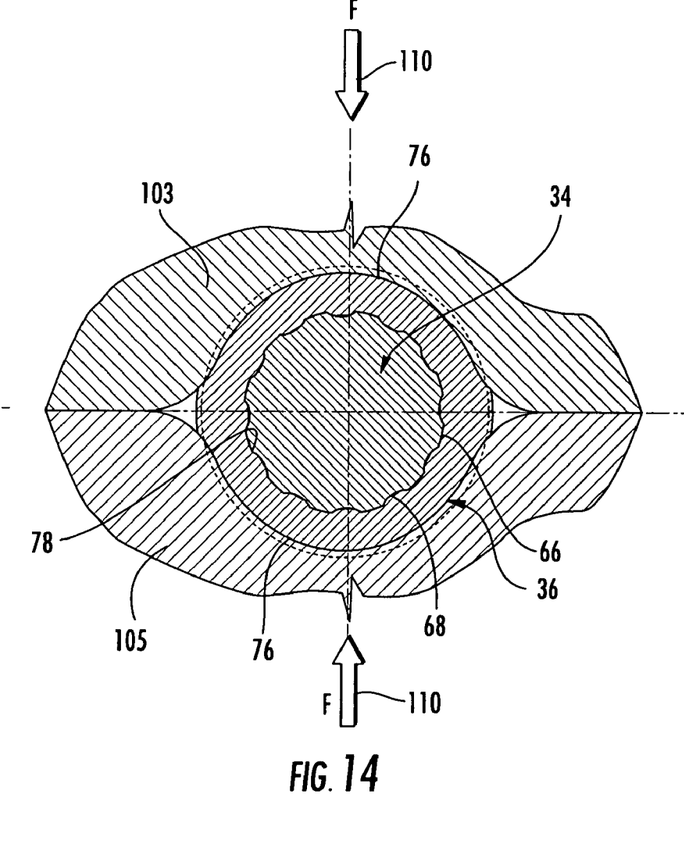
FIG. 14 is an enlarged cross sectional view of FIG. 12 illustrating the input shaft, the torsion shaft, the output shaft, and portions of the actuator applying a force to the output shaft.

In the exemplary embodiment illustrated in FIGS. 13 and 14, the actuator 102 may include separated members 103, 105 configured to contact a substantial circumferential portion of the outer surface 76 of the output shaft 36. The actuator 102 applies the force 110 to the outer surface 76 of the input shaft 32 to urge the inner surface 78 of the output shaft 36 toward the splines 62 of the input shaft 32. The force 110 urges inner surface 78 into the splines 62 such that a substantial plurality of portions of the inner surface 78 protrude into valleys 68 of the splines 62. When the actuator 102 and members 103, 105 are removed from the output shaft 36, the end portion 58 of the torsion shaft is fixedly coupled to the end portion 72 of the output shaft 36, as illustrated in FIG. 2.

During operation of the vehicle power steering assembly 12, a torque applied to the input shaft 32 will urge the torsion shaft 34 to rotate in the same direction as the applied torque. The rotation of the torsion shaft 34 is limited by the amount of rotational movement of the input shaft 32 or output shaft 36 before surfaces defined by the stopping flanges 46, 47 contact the respective surfaces defined by the slots 80, 81 of the output shaft 36. For instance, a torque applied to the input shaft 32 will rotate the torsion shaft 34 until contact occurs between a slot surface and a respective flange surface. Further rotation or torque applied to the input shaft 32 will not be transferred through the torsion shaft 34, but only between the input shaft 32 and the output shaft 36. Of course, the rotation of the torsion shaft 34 is limited in the same manner if torque is applied to the output shaft 36, thereby transmitting the torque from the output shaft 36 through the torsion shaft 34 to the input shaft 32.

The exemplary embodiments of the vehicle power steering assembly 12 described herein, including the splines 60, 62, permit the use of shafts having harder materials for rigidly coupling the torsion shaft 34 to the input and output shafts 32, 36. The spline connections allow the use of a harder shaft material compared to vehicle steering column assemblies that use drill and pin connection methods. Further, the input shaft 32, torsion shaft 34, and the output shaft 36 can be made of a hard material such as but not limited to steel. In an exemplary embodiment discussed herein, the hardness of the torsion shaft 34 is greater than 30Rockwell C. Of course, in another alternative embodiment, the hardness of the torsion shaft 34 is less than 30 Rockwell C. Alternative exemplary embodiments include configurations where the hardness values of the input, output and torsion shafts 32, 34, 36 may or may not be equal.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A power steering assembly for a vehicle, comprising:
   an input shaft having first and second end portions extending along an axis and a first aperture extending substantially axially into the first end portion;
   a torsion shaft having third and fourth end portions, the third end portion having a first plurality of splines and the fourth end portion having a second plurality of splines, the third end portion being disposed in the first aperture, the first plurality of splines on the third end portion fixedly coupling the torsion shaft to the input shaft;
   an output shaft having fifth and sixth end portions and a second aperture extending substantially axially into the fifth end portion toward the sixth end portion, the fourth end portion of the torsion shaft being disposed in the second aperture, the second plurality of splines on the fourth end portion fixedly coupling the torsion shaft to the output shaft the input shaft further having at least one stopping flange proximate the first end portion extending outwardly from an outer surface of the input shaft;

the fifth end portion of the output shaft being configured to overlap the first end portion of the input shaft such that at least a portion of the first end portion is disposed in the second aperture;

the output shaft having at least one slot extending from the second aperture into the fifth end portion configured to receive the stopping flange of the input shaft; and wherein rotation of the input shaft and the stopping flange at least a predetermined distance in a first direction induces the stopping flange to engage a surface defined by the slot to induce rotational movement of the output shaft in the first direction.

2. The power steering assembly of claim 1, wherein the torsion shaft is constructed from a steel having a hardness greater than or equal to 30 Rockwell C.

3. The power steering assembly of claim 1, wherein the input shaft is configured to be operably coupled to a vehicle steering wheel.

4. The power steering assembly of claim 1, wherein the output shaft is configured to be operably coupled to an intermediate shaft that is further operably coupled to a gear assembly.

5. The power steering assembly of claim 1, wherein the first plurality of splines are disposed around an outer periphery of the third end portion of the torsion shaft.

6. The power steering assembly of claim 5, wherein the second plurality of splines are disposed around an outer periphery of the fourth end portion of the torsion shaft.

7. The power steering assembly of claim 1, further comprising a torque sensor operably coupled to the torsion shaft configured to indicate an angular displacement between the input shaft and the output shaft.

8. A vehicle steering system, comprising:

a steering wheel;

an input shaft having first and second end portions extending along an axis and a first aperture extending substantially axially into the first end portion, the second end portion being operably coupled to the steering wheel;

a torsion shaft having third and fourth end portions, the third end portion having a first plurality of splines and the fourth end portion having a second plurality of splines, the third end portion being disposed in the first aperture, the first plurality of splines on the third end portion fixedly coupling the torsion shaft to the input shaft;

an output shaft having fifth and sixth end portions and a second aperture extending substantially axially into the fifth end portion toward the sixth end portion, the fourth end portion of the torsion shaft being disposed in the second aperture, the second plurality of splines on the fourth end portion of the torsion shaft fixedly coupling the torsion shaft to the output shaft the input shaft further having at least one stopping flange proximate the first end portion extending outwardly from an outer surface of the input shaft;

the fifth end portion of the output shaft configured to overlap the first end portion of the input shaft such that at least a portion of the first end portion is disposed in the second aperture;

the output shaft having at least one slot extending from the second aperture into the fifth end portion configured to receive the stopping flange of the input shaft; and wherein rotation of the input shaft and the stopping flange at least the predetermined distance in a first direction induces the stopping flange to engage a surface defined by the slot to induce rotational movement of the output shaft in the first direction.

9. The vehicle steering system of claim 8, wherein the torsion shaft is constructed from a steel having a hardness greater or equal to 30 Rockwell C.

\* \* \* \* \*